United States Patent Office 3,113,470
Patented Dec. 10, 1963

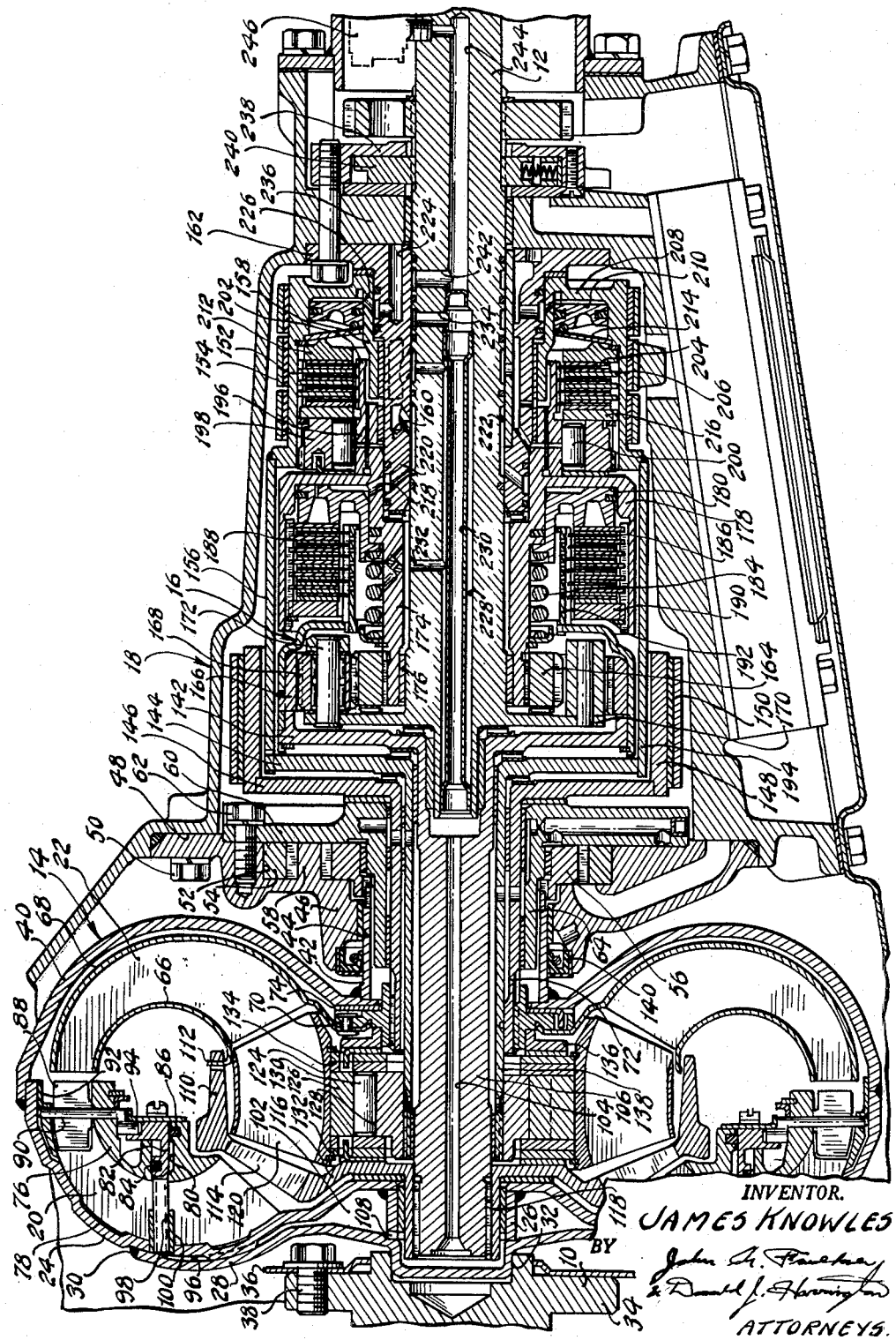

3,113,470
POWER TRANSMISSION MECHANISM
James Knowles, Birmingham, Mich., assignor to Ford Motor Company, Dearborn, Mich., a corporation of Delaware
Filed May 4, 1960, Ser. No. 26,827
4 Claims. (Cl. 74—677)

My invention relates generally to power transmitting mechanisms, and more particularly to a hydrokinetic mechanism capable of being used in the power delivery train of an automotive vehicle for transferring driving torque from the vehicle engine to the vehicle traction wheels.

The mechanism of my invention is capable of providing two forward driving speed ratios and a single reverse driving speed ratio. A forward driving speed ratio change can be obtained with a high degree of smoothness without interrupting the torque delivery path during a shift sequence.

The provision of a transmission of this type being a principal object of my invention, it is a further object to provide a hydrokinetic power transmission mechanism of simplified construction which comprises a hydrokinetic unit and a planetary gear unit that cooperate to provide multiple forward driving speed ratios and a reverse driving ratio.

It is a further object of my invention to provide a power transmitting mechanism with a hydrokinetic torque converter unit and a simple planetary gear unit wherein the stator of the torque converter unit functions as a hydrokinetic reaction member during forward drive operation, and wherein means are provided for conditioning the stator for operation as a turbine during reverse drive operation. Means are also provided for mechanically transmitting reverse driving torque from the stator element to an element of the gear unit when the stator is so conditioned for reverse drive operation.

A further object of my invention resides in a strategic disposition of the members of the hydrokinetic portions of the mechanism with respect to the members of the gear unit so that the hydrokinetic portions may cooperate both structurally and functionally with the gear members to form a compact, simplified and mechanically efficient power transmitting unit.

It is a further object of my invention to provide a multiple speed ratio power transmission mechanism of the type above set forth wherein provision is made for accomplishing a gear ratio change without the need for sequentially actuating or releasing transmission clutch or brake members.

A further object of my invention resides in a novel arrangement of the gear motion controlling portions of the mechanism so that the transverse and longitudinal dimensions of the mechanism are desirably reduced to a minimum.

Further objects and advantages of my transmission mechanism will become apparent from the following description and from the accompanying drawing which shows a longitudinal cross-sectional view of my transmission mechanism.

In the drawing, numeral 10 designates an engine crankshaft and numeral 12 designates a power output shaft for the transmission mechanism. A hydrokinetic torque converter unit is generally designated by reference character 14, and a simple planetary gear unit that acts in cooperation with the torque converter unit of the mechanism is generally designated by numeral 16. The hydrokinetic unit 14 and the gear unit 16 of the mechanism are situated within a common housing of cast construction, said housing being generally identified by reference character 18.

The hydrokinetic unit 14 of the mechanism includes a torque converter pump 20 and a torque converter turbine 22, said pump 20 being situated at the forward or left-hand end of the transmission mechanism in cooperating, juxtaposed relationship with respect to the turbine 22. The pump 20 comprises a pump shell 24 having a semi-toroidal shape as indicated. The central hub portion of the shell 24 is welded or otherwise secured to a bearing sleeve or spacer member 26 situated between the radially inward portion of shell 20 and an outer plate 28 which forms a part of the shell assembly. The plate 28 is welded about its periphery to the outer surface of shell 24, as indicated at 30, and it cooperates with the shell 20 to define a pressure cavity. The central portion of plate 28 is piloted, as shown, within a pilot recess 32 formed in the end of crankshaft 10.

A flange 34 is formed on crankshaft 10 and a flexible drive plate 36 is secured thereto by means of bolts 38. The radially outward portion of drive plate 36 can be secured to the periphery of the pump shell 24 in a conventional fashion. Further, drive plate 36 can be adapted to carry a ring gear which forms a part of the engine starter motor gear train.

The periphery of the pump shell 24 is joined by means of a peripheral weld to a supporting shell 40 that is also formed in the shape of a semi-torus. The hub of shell 40 is welded to a bearing sleeve 42 which in turn extends axially within a bearing recess 44 formed in a supporting wall 46 of the housing 18. The wall 46 extends in a generally transverse direction and is secured at its periphery to a cooperating shoulder of the housing 18 by suitable bolts 50. The sleeve 42 is journaled within bearing recess 44 by a suitable bushing.

The wall 46 has formed therein a pump cavity 52 within which is positioned a pair of cooperating gear pump members which are identified in the drawing by reference characters 54 and 56. These members 54 and 56 are disposed in driving engagement in a conventional fashion and they are mounted for rotation about eccentric axes. A pump crescent 58 is formed integrally with wall 46 and is situated in the space between the pump members 54 and 56. The pump cavity 52 is closed by a plate or closure member 60 that is bolted to wall 46 by suitable bolts 62. The plate 60 includes an axially extending sleeve 64 which is received within the aforementioned sleeve 42.

The turbine 22 comprises an inner shroud 66 and an outer shroud 68, said shrouds being toroidal in form and cooperating to define a toroidal fluid circulatory passage. Turbine blade elements are situated within the toroidal passage defined by the shrouds 66 and 68. The turbine blades and the shrouds 66 and 68 may be formed of sheet metal stampings and fabricated in any well-known fashion to form an integral turbine assembly. The hub of the outer shroud 68 of the turbine 22 is connected to a turbine hub member 70 that is positively connected to a sleeve shaft 72, said shaft 72 in turn being journaled within the aforementioned stationary sleeve 64 by suitable bushings as indicated. A thrust washer 74 may be situated between the radially inward portion of the shell 40 and the hub member 70.

The pump is comprised of a central cast shroud 76 in the form of a torus, and pump blades may be integrally formed with the shroud 76 and cast during the same casting operation. I contemplate that the pump 20 can be fabricated by a suitable die casting operation and that it may be formed from a suitable aluminum alloy. The pump blades for the pump 20 can be provided with one or more projections 78 that are received within cooperating recesses formed in the shell 24 to form a unitary converter pump assembly.

The inner shroud 20 is formed with an annular cylinder 80 within which is slidably positioned a piston 82.

Suitable sealing rings 84 and 86 are carried by the piston 82 and the shroud 76 so that the chamber defined by the cylinder 80 and the cooperating piston 82 can function as a fluid pressure servo chamber.

The pump 20 further includes a plurality of pump blade exit portions identified by reference character 88. One such blade portion 88 is situated at the exit region of each pump blade and it is adjustable about a substantially radial axis. In this way the effective blade exit angle for the pump 20 can be altered between predetermined design limits. The exit portions 88 are mounted on supporting shafts 90 that are journaled within the shroud 76 of the pump 20. The shafts 90 can further be suitably supported by the pump shell 24, a suitable supporting flange member 92 being provided for this purpose.

The radially inward ends of the shafts 90 are offset as indicated at 94, and they are each received within a cooperating groove formed in piston 82. When the piston 82 is moved in an axial direction, the shafts 90 are rotated about their respective axes, thereby causing the blade exit portions 88 to assume either one adjusted position or another. The performance characteristics of the torque converter can be altered as desired by providing a suitable blade adjusting control means for the pump blade exit portions 88.

The pressure chamber defined by the cooperating piston 82 and the annular cylinder 80 is in fluid communication with the cavity 96 defined by the plate 28 and by the cooperating shell 24. This fluid communication is established by a passage 98 extending through one of the pump blades. If desired, a sleeve 100 can be inserted through an opening in the shell 24 into a counterbored region of the passage 98.

The radially outward region of the cavity 96 in the vicinity of passage 98 is in fluid communication with the radially inward region thereof, the latter being identified by reference character 102. This region 102 is in fluid communication with a passage 104 formed in a turbine shaft 106. The spacer 26 is formed with a recess 108 for establishing this fluid communication.

A turbine torque transfer member is shown at 110 and it is positioned in part within the central region of the torus defined by the cooperating turbine shroud 66 and pump shroud 76. The member 110 is positively connected to a flange 112 formed on the turbine shroud 66.

The torque transfer member 110 includes a radially extending web or spacer portion 114 which establish a bridge or a driving connection between the outer periphery of member 110 and a hub portion 116. This hub portion 116 is positively splined to the aforementioned turbine shaft 106 as indicated at 118. A suitable bushing is situated between the hub portion 116 and the spacer 26 for the pump shell 24 for the purpose of rotatably supporting the latter. Also, a thrust washer can be positioned between these parts as indicated. The web portion 114 of the member 110 will not inhibit toroidal fluid flow within the torus circuit during operation.

The torque converter reactor is shown at 120 and it includes a first shroud 122 and a second shroud 124. This reactor can be formed by a suitable casting operation in any well-known fashion. The reactor is comprised in part of circumferentially spaced reactor blades that are disposed between the exit section of the turbine 22 and the entrance section of pump 20. The aforementioned web portion 114 of the member 110 is disposed between the exit section of the reactor 120 and the entrance section of the pump 20, and it occupies a minimum amount of space.

The shroud 124 can be internally keyed or splined to accommodate an externally keyed or splined one-way brake race 126. An inner brake race is shown at 128 and a plurality of rollers are situated between the races 126 and 128 as shown at 130, said rollers 130 cooperating with cam surfaces formed in race 126. Washers 132 and 134 are disposed on either axial side of the brake races 126 and 128 and are held in place within the central opening in the shroud 124 by suitable snap rings as indicated. A thrust member 136 is disposed between the hub member 70 of the turbine 22 and washers 134, and a suitable thrust washer is positioned therebetween to accommodate the thrust reaction which is experienced during operation. Similarly, a thrust washer is situated between washers 132 and the hub portion 116 of member 110.

The inner brake race 124 is positively splined to a sleeve shaft 138 which extends in an axial direction in concentric relationship with respect to the aforementioned turbine shaft 106. Spaced bushings are provided between shafts 106 and 138 to provide needed support. Similarly, bushings are provided between shafts 138 and 72 for support purposes. Each shaft of the assembly of concentric shafts 106, 38, 72 and 42 is therefore journaled for relative rotation within the wall 46, and a seal 140 is provided for isolating the interior region of the torque converter 14 from the surrounding cavity defined by the housing 18.

The shafts 106, 138 and 72 are formed with radially extending parts 142, 144 and 146 respectively, said parts being disposed on the right-hand side of the wall 46 as viewed in the drawing. The part 146 is connected to a brake drum 148. The brake band 150 is disposed about the brake drum 148, and it may be energized by means of a brake operating servo of conventional construction. This servo may form a part of a control valve circuit, not specifically shown or described herein. As will become apparent later from a description of the operation, the brake band 150 is energized to condition the transmission for operation in reverse drive.

A second brake drum is shown at 152 and a second friction brake band 154 is disposed about brake drum 152 as indicated. By preference, the brake band 154 is of the multiple strap type in order to provide an increased braking capacity. The brake band 154 may also be operated by means of a conventional brake operating servo that forms a part of the control valve circuit.

Brake drum 152 is drivably connected to the shaft part 144 by a torque transfer member 156, the latter being in the form of a drum.

The brake drum 152 includes an axially extending hub portion 158 which is journaled for rotation about an axial extension 160 of an adaptor 162, said extension being in the form of a stationary bearing sleeve shaft.

A simple planetary gear unit is enclosed within the drum 156 and it includes a sun gear 164, a ring gear 166 and cooperating planet gears 168. The planet gears 168 are rotatably journaled on a carrier 170 that is defined in part by pinion shafts 172. The shafts 172 bridge spaced portions of the carrier 170 and suitable needle bearings or the like are situated thereon for rotatably journalling the individual planet gears 168. The sun gear 164 is positively splined to a sun gear sleeve shaft 174 which in turn is supported by bushing 176 on the power output shaft 12. Sleeve shaft 174 is further supported by the aforementioned bearing sleeve 160.

The sun gear sleeve shaft 174 is connected to a clutch drum member 178 which defines in part annular cylinder 180. The clutch piston member 182 is slidably positioned within annular cylinder 180 and it is normally urged in a right-hand direction, as viewed in the drawing, by a piston return spring 184 that is anchored as shown on a suitable spring seat connected to the sun gear shaft 174.

The clutch member 178 is internally splined to accommodate externally splined clutch discs 186. These discs 186 are situated in alternating adjacent relationship with respect to clutch discs 188, said discs 186 and 188 defining a multiple disc clutch assembly. A clutch disc backup member 190 is also carried by clutch member 178.

Another clutch member 192 is provided as shown with external splines to accommodate a driving connection with internal splines on the clutch disc 188, and it is in turn drivably connected to ring gear 166 by means of a member 194 positively carried by the aforementioned part 142.

Fluid pressure may be admitted into the working chamber defined by the cooperating annular cylinder 180 and pistons 182 in order to urge the clutch discs 186 and 188 into frictional clutching engagement, thereby establishing a locked-up condition of the simple planetary gear unit.

The carrier 170 of the planetary gear unit is integrally joined to power output shaft 12. The sun gear shaft 174 is formed with a one-way brake race 196. An outer brake race 198 is positively connected to the interior of brake drum 152, and a suitable thrust washer is disposed between race 198 and the clutch member 178. The race 198 may be formed with cammed surfaces and roller or sprag clutch elements 200 are situated between the races 198 and 196 to establish a one-way brake for sun gear 164.

The race 196 includes an externally splined extension 202 which carries an internally splined clutch disc 204. Similarly, the brake drum 152 is internally splined to accommodate a driving connection with externally splined clutch disc 206. The discs 204 and 206 are situated in alternating adjacent relationship to establish a multiple disc clutch assembly.

The brake drum 152 defines in part an annular cylinder 208 within which is received a cooperating annular piston 210. The piston 210 and the cooperating cylinder 208 function as a servo unit for energizing the clutch disc assembly 204 and 206. The force applied to piston 210 is transferred to a clutch pressure plate 212 through a Belleville type spring lever 214, said spring lever 214 being anchored at its outer periphery to the brake drum 152. An intermediate portion of the spring lever 214 engages pressure plate 212. The reaction force is absorbed by a reaction plate 216 that is carried by the brake drum and secured in place by means of a suitable snap-ring, as indicated.

The bearing sleeve 160 also functions as an oil pressure distributor gallery, and it is suitably ported for this purpose. Fluid pressure can be admitted into the annular cylinder 180 for the front clutch assemlby through communicating passages 218 and 220 formed in clutch member 178 and in the bearing support 160, respectively, and through annular groove 222 which in turn communicates with another pressure distributor passage formed in the bearing support 160. This latter passage can be connected to the control valve assembly through suitable internal passage structure not shown. Similarly, fluid pressure can be admitted into annular cylinder 208 through a passage 224 formed in the bearing support 160, and through a communicating passage 226 formed in the brake drum 152. Passage 224 can be connected to the control valve assembly through suitable internal passage structure not shown.

The power output shaft 12 is formed with a central bore or passage 228 within which is positioned a pressure distributor element 230. The central passage defined by distributor element 230 communicates at the right-hand end thereof with a radial passage 232 formed in power output shaft 12, and this passage in turn communicates with an annular groove that is connected to the control valve body through suitable internal passage structure not shown. In this way fluid pressure may be distributed through passage 230 and through passage 104 to the cavity 96 defined by the plate 28 and the pump shell 24. In this way fluid pressure may be admitted into the servo mechanism for adjustably positioning the pump blade exit portions. The control mechanism can be calibrated to automatically provide a suitable adjustment to condition the torque converter for optimum performance at the low speed ratio operating range. After the speed ratio increases, the blade exit portions can then be suitably adjusted in response to changes in the torque converter speed ratio to condition the torque converter for operation with maximum efficiency. A wide variety of torque converter characteristics can be obtained in this way.

Further, the pump blade exit adjusting mechanism can be used for cushioning a transition from one operating speed ratio to another. This can be done by phasing in the blade exit portion of the pump during an operating speed ratio shift interval, and this phasing action can be accomplished in response to variations in a suitable control variable. Further, the annular passage defined by the distributor element 230 and the inner wall of bore 228 serves as a lubricating oil passage and it communicates with a radial passage 234 in the power output shaft 12. Passage 234 in turn is connected to a suitable source of lubrication oil pressure.

Shaft 12 is rotatably journaled within an end boss or wall 236 of the housing 18. A rear pump cover 238 is bolted to the rearward end of wall 236 as indicated, and it cooperates with wall 236 to define a pump cavity for a positive displacement fluid pump 240. The rotor for pump 240 is drivably connected to power output shaft 12, and the pump 240 is capable of supplying a control pressure whenever shaft 12 is rotating. A radial passage 242 is journaled in shaft 12 and it commmunicates with the discharge side of pump 240 through suitable internal passage structure not shown. Passage 242 in turn communicates with an axially extending passage 244 which in turn is in fluid communication with a centrifugally operated governor 246. By preference, the governor 246 is of the type disclosed in the copending application of Robert O. Dameron, Serial No. 683,830, now Patent No. 2,973,670, which is assigned to the assignee of my instant invention. Governor 246 is capable of providing a pressure signal in passage 244 that is proportional in magnitude to the speed of rotation of power output shaft 12 and this signal may be utilized by the control valve circuit as an indicator of speed to establish an automatic shift sequence.

In order to provide an understanding of the mode of operation of the clutches and brakes in conditioning the transmission mechanism for the various speed ratio changes, I have set forth the following summary.

The transmission mechanism may be conditioned for low speed operation by energizing brake band 154, hereinafter referred to as the forward brake band. Both of the clutches are deenergized during low speed operation.

The engine will deliver driving torque to the converter pump, and fluid circulation is therefore established in a known fashion to impart a driving torque to the turbine 22. This turbine torque is transferred through torque transfer member 110 to the intermediate turbine shaft 106. The turbine torque is therefore applied to the ring gear 166. Since the carrier 170 is connected to the power output shaft 12, the resulting reverse torque reaction is transferred through sun gear shaft 174 to the overrunning brake shown in part at 200. The outer brake race 198 is held by the energized brake band 154, and the sun gear 164 is therefore anchored in this fashion. The carrier and power output shaft 12 are therefore driven at a multiplied turbine torque.

To condition the transmission mechanism for second speed or high speed operation, it is merely necessary to energize the forward clutch disc assembly shown in part at 186 and 188. This locks the ring gear 166 to the sun gear 164 so that the simple planetary gear unit will operate with a 1:1 driving ratio. The brake band 154 may be continuously energized during this speed ratio change, and the sun gear 164 is allowed to drive in a forward direction by reason of the overrunning brake shown in part at 200. This shift from low speed operation to high speed operation may be referred to as a "pick-up shift" by reason of the operation of the overrunning brake, and sequencing of the transmission clutch and brake servos is not necessary to accomplish this shift.

To condition the transmission for reverse drive operation, the brake band 150 is energized and the clutch assembly 204 and 206 is simultaneously applied. Forward drive brake band 154 is released. Brake band 150 is effective to anchor turbine 22, and since the intermediate turbine shaft 106 and ring gear 166 are connected to the turbine 22 through the torque transfer member 110, the ring gear 166 is also anchored by brake band 150. Further, since the forward drive brake band is released and since the clutch disc assembly 204 and 206 is energized, a driving connection is established between the sleeve shaft 138 and the sun gear 164 for the simple planetary gear unit. The reactor 120 for the torque converter unit is therefore capable of delivering a reverse driving torque through the brake, shown in part at 130, through shaft 138, through torque transfer member 156, through the energized clutch disc assembly 204 and 206 and through the sun gear shaft 174 to the sun gear 164. The reverse torque applied to the reactor by the torus flow in the hydrokinetic circuit therefore drives the sun gear 164 in a reverse direction, and since the ring gear 166 is anchored, the carrier 170 and the power output shaft 12 are driven in a reverse direction. The reverse torque of the torque converter reactor is multiplied by the gear ratio of the simple planetary unit.

The inverted relationship between the converter pump and turbine members and the strategic disposition of the torque transmitting sleeve shafts make it possible to combine the simple planetary gear unit with the hydrokinetic converter to form an over-all multiple speed power transmission mechanism with a high degree of compactness. This compact arrangement is accomplished without any undesirable penalties from a performance or an efficiency standpoint.

Having thus described a preferred embodiment of my invention, what I claim and desire to secure by United States Letters Patent is:

1. In a power transmission mechanism for transferring torque from a driving shaft to a driven shaft, a hydrokinetic torque converter, a simple planetary gear unit, said gear unit comprising a sun gear, a ring gear, a carrier and planet gears carried by said carrier in meshing engagement with said sun and ring gears, said converter including a bladed pump member, a bladed turbine member and a bladed reactor member which cooperate to define a closed toroidal fluid flow circuit, said pump member being situated adjacent said driving member and connected thereto, said pump member including also angularly adjustable blade exit elements at the flow exit region thereof, an inner pump shroud defining in part said flow circuit, fluid pressure operated servo means carried by said inner shroud within the inner confines of said flow circuit for adjusting the angularity of said blade exit elements, said turbine member being disposed in juxtaposed relationship with respect to said pump member between said pump member and said gear unit, first, second and third torque delivery shafts situated between said converter and said gear unit in concentric relationship, said turbine member being drivably connected to the innermost concentric shaft and to the outermost concentric shaft, the connection between said turbine member and the innermost concentric shaft comprising a torque transfer element disposed transversely through said circuit between the entrance region of said pump member and the exit region of said reactor member, overrunning coupling means for connecting the intermediate concentric shaft to said reactor member, the innermost concentric shaft being connected to said ring gear, said carrier being connected to said driven shaft, brake means for selectively anchoring the outermost concentric shaft to condition said transmission for operation in reverse drive, a torque transfer member connected to the intermediate concentric shaft, said torque transfer member surrounding and enclosing said gear unit including a friction brake drum, said brake drum defining in part a friction brake means for selectively anchoring said reactor shaft, reverse drive friction clutch structure having portions that are common to said friction brake means for connecting said sun gear to said torque transfer member, overrunning brake means for anchoring said sun gear to said brake drum during low speed forward drive operation and friction clutch means disposed within the torque transfer member for said intermediate concentric shaft for clutching together two members of said gear unit to establish a high speed driving ratio.

2. In a power transmission mechanism for transferring torque from a driving shaft to a driven shaft, a hydrokinetic torque converter, a planetary gear unit, said gear unit comprising a sun gear, a ring gear, a carrier, and planet gears carried by said carrier in meshing engagement with said sun and ring gears, said converter including a pump member, a turbine member and a reactor member which cooperate to define a closed toroidal fluid circuit, said pump member being disposed adjacent said driving shaft and said turbine member being situated between said pump member and said gear unit, a central turbine shaft connected to said ring gear, a reactor sleeve shaft surrounding said central turbine shaft, overrunning coupling means for connecting said reactor member to said reactor sleeve shaft, a second turbine sleeve shaft surrounding said first central turbine shaft, said turbine member being connected to said turbine sleeve shaft, brake means for selectively anchoring said turbine sleeve shaft, a torque transfer member extending through said toroidal fluid circuit between said reactor member and said pump member, said torque transfer member being adapted to drivably connect said turbine to said central turbine shaft, said carrier being connected to said driven shaft, means for anchoring said reactor shaft during forward drive operation including a torque transfer drum enclosing said gear unit and a selectively engageable friction brake means for anchoring said drum during forward drive operation, overrunning brake means for anchoring said sun gear including one race connected to said drum and another race connected to said sun gear with one-way brake elements disposed therebetween, selectively engageable friction clutch means for connecting said drum directly to said sun gear during reverse drive operation, means for selectively clutching two elements of said gear unit together to establish a high speed driving ratio, said pump member including an inner shroud and a shell, pump blades disposed between said inner shroud and said outer shell, adjustable blade exit sections situated at the exit region of said pump member, fluid pressure operated servo means carried by the inner shroud for adjustably positioning said blade exit sections, an outer plate secured to the outer side of said shell and cooperating therewith to define an annular fluid pressure passage defined in part by said shell, means for establishing communication between said passage and the fluid pressure operated servo in said inner shroud, and an axial bore formed in said innermost concentric shaft, said axial bore being in fluid communication with the passage defined by said shell and by said plate whereby control pressure is distributed to the servo means for said blade exit sections.

3. In a power transmission mechanism for transferring torque from a driving shaft to a driven shaft, a hydrokinetic torque converter, a planetary gear unit, said gear unit comprising a sun gear, a ring gear, a carrier, and planet gears carried by said carrier in meshing engagement with said sun and ring gears, said converter including a pump member, a turbine member and a reactor member which cooperate to define a toroidal flow circuit, said pump member being disposed adjacent said driving member, said turbine member being situated in juxtaposed relationship with respect to said pump member between said pump member and said gear unit, a central turbine shaft connected to said ring gear, a reactor sleeve shaft surrounding said central turbine shaft, overrunning coupling means for connecting said reactor member to said reactor sleeve shaft, a second driven sleeve shaft surrounding said central turbine shaft, a torque transfer member extending transversely through said toroidal fluid flow circuit between the exit section of said reactor member and the exit section of said pump member, said torque transfer member being adapted to drivably connect said turbine member to said central turbine shaft, said turbine member also being connected to said turbine sleeve shaft, brake means for selectively anchoring said turbine sleeve shaft, said carrier being connected to said driven shaft, means for anchoring said reactor shaft during forward drive operation including a torque transfer drum enclosing said gear unit, selectively engageable friction brake means for anchoring said drum during forward drive operation, overrunning brake means for anchoring said sun gear during low speed forward drive operation including one race connected to said drum and another race connected to said sun gear with one-way brake elements disposed therebetween, selectively engageable friction clutch means for connecting said drum directly to said sun gear during reverse drive operation, means for selectively clutching two elements of said gear unit together to establish a high speed forward driving ratio, torque transfer means defined in part by the aforesaid anchoring means for said reactor shaft, said torque transfer means also being defined in part by a selectively engageable clutch and adapted to establish a driving connection between said reactor sleeve shaft and said sun gear during reverse drive operation, said pump member including an inner shroud and an outer shell, pump blades disposed between said inner shroud and said outer shell, adjustable blade exit sections situated at the exit region of said pump member, fluid pressure operated servo means carried by the inner shroud for adjustably positioning said blade exit sections, an outer plate secured to the outer side of said outer shell and cooperating therewith to define an annular fluid pressure passage, means for establishing communication between said passage and the fluid pressure operated servo in said shroud and an axial bore formed in said innermost concentric shaft, said axial bore being in fluid communication with the passage defined by said shell and by said plate whereby control pressure is distributed to the servo means for said blade exit sections.

4. In a power transmission mechanism for transferring torque from a driving shaft to a driven shaft, a hydrokinetic torque converter, a planetary gear unit, said gear unit comprising a sun gear, a ring gear, a carrier and planet gears carried by said carrier in meshing engagement with said sun and ring gears, said converter including a pump member situated adjacent said driving shaft, a turbine member disposed in juxtaposed relationship with said pump member between said pump member and said gear unit, a converter reactor member, said pump member, turbine member and reactor member cooperating to define a closed toroidal fluid circuit, a first central turbine shaft connected to said ring gear, a reactor sleeve shaft surrounding said central turbine shaft, overrunning coupling means for connecting said reactor member to said reactor sleeve shaft, a second turbine sleeve shaft surrounding said first central turbine shaft, means for connecting said turbine member to both said first and second turbine shafts, brake means for selectively anchoring said second turbine shaft, said carrier being connected to said driven shaft, means for anchoring said reactor shaft during forward drive operation including a torque transfer drum enclosing said gear unit and a selectively engageable friction brake means for anchoring said drum during forward drive operation, overrunning brake means for anchoring said sun gear member during low speed forward driving operation including one race connected to said drum and another race connected to said sun gear with one-way brake elements disposed therebetween, selectively engageable friction clutch means for connecting said drum directly to said sun gear during reverse drive operation, means for selectively clutching together two members of said gear unit to establish a high speed forward driving ratio, said pump member comprising an inner shroud and an outer shell, pump blades situated between said shroud and said outer shell, blade exit portions disposed at the radially outward exit section of said pump member, servo means carried by said inner shroud and partly defined thereby for adjustably positioning said blade exit sections to alter the effective blade exit angle, an outer plate secured to the outer side of said outer shell and cooperating therewith to define a fluid pressure passage extending from a radially inward region to a radial location having a radius substantially equal to the effective radius of said servo means, a passage at said radial location formed in said inner shroud and extending through the region of said blades for establishing communication between said servo means and the radial passage defined in part by said one blade, and a fluid pressure distributor passage formed in said first turbine shaft, said distributor passage being in fluid communication with the aforementioned radially extending passage whereby servo actuating pressure may be distributed to said servo means.

References Cited in the file of this patent

UNITED STATES PATENTS

| | | |
|---|---|---|
| 2,293,358 | Pollard | Aug. 18, 1942 |
| 2,578,450 | Pollard | Dec. 11, 1951 |
| 2,612,791 | Miller et al. | Oct. 7, 1952 |
| 2,695,533 | Pollard | Nov. 3, 1954 |
| 2,853,855 | Ahlen | Sept. 30, 1958 |
| 2,908,190 | Hause | Oct. 13, 1959 |
| 2,919,607 | Moore | Jan. 5, 1960 |
| 2,968,197 | De Lorean | Jan. 17, 1961 |